United States Patent [19]

Brown, deceased et al.

[11] Patent Number: 4,829,861
[45] Date of Patent: May 16, 1989

[54] HEADSTOCK ASSEMBLY FOR A CHUCKER AND BAR MACHINE

[75] Inventors: Ivan R. Brown, deceased, late of Breesport, N.Y., by Claudia D. Brown, executrix; Harold E. Walburn, Elmira; Jayesh B. Patel, Horseheads, both of N.Y.

[73] Assignee: Hardinge Brothers, Inc., Elmira, N.Y.

[21] Appl. No.: 118,951

[22] Filed: Nov. 10, 1987

[51] Int. Cl.[4] .......................... B23B 19/02; B23B 3/36
[52] U.S. Cl. ......................................... 82/142; 82/147; 82/153; 82/900; 82/901
[58] Field of Search ................... 82/28 R, 30, DIG. 1, 82/DIG. 2, DIG. 8, DIG. 9, 34 A, 34 B

[56] References Cited

U.S. PATENT DOCUMENTS

| | | | |
|---|---|---|---|
| 2,861,471 | 8/1956 | Kronenberg | 82/903 |
| 3,317,258 | 5/1967 | Hermann | 82/900 |
| 3,916,582 | 11/1975 | Costil | 51/288 |
| 4,068,545 | 1/1978 | Scheler | 82/2.5 |
| 4,106,376 | 8/1978 | Freer | 82/28 R |
| 4,158,319 | 6/1979 | Blockley et al. | 82/2 B |
| 4,194,798 | 5/1980 | Schonwald et al. | 384/476 |
| 4,547,082 | 10/1985 | Gerretz et al. | 384/320 |
| 4,580,471 | 4/1986 | Oyama et al. | 82/900 |

FOREIGN PATENT DOCUMENTS 0207167 2/1984 German Democratic Rep. ... 82/900

Primary Examiner—Eugene R. LaRoche
Assistant Examiner—Nathan W. McCutcheon
Attorney, Agent, or Firm—Shlesinger & Myers

[57] ABSTRACT

This invention pertains to a head stock assembly for a chucker and bar machine which includes a special bearing system comprising three forward bearings and two rearward bearings for providing five point contacts to the spindle for maintaining stiffness and rigidity and improved accuracy in machining. It also includes cooling fin means for dissipating the heat about the bearings which would normally build up in a headstock after long periods of operation. The heat dissipation reduces growth of the headstock and therefore improves accuracy. In addition, the headstock assembly has mounted directly thereon a spindle encoder, a brake disc, a collet closer mechanism, a balancing disc, as well as a low pressure means for preventing cutting fluids and dust and dirt from entering into the bearing mechanism.

43 Claims, 5 Drawing Sheets of this invention:

HEADSTOCK ASSEMBLY FOR A CHUCKER AND BAR MACHINE

FIELD OF THE INVENTION

This invention pertains to a headstock assembly for use in chucker and bar machines having all of the major components mounted in and on the headstock for compactness and includes means for dissipating heat and thus reducing growth of the headstock during machine operation over long periods.

HISTORICAL BACKGROUND

In the past, headstock assemblies have been relatively large components of a chucker and bar machine. Most of the adjunct components have been secured to the machine base rather than the headstock, since the headstock tends to grow significantly in the course of long operation due to heat build up in the headstock. Heat build up causes substantial changes in various areas of the headstock and particularly in the area of the bearings which support the spindle. Because of this, severe stress and loads on the headstock amplify deviations and reduce accuracy. In the past, standard chucker and bar machines had difficulties in maintaining accuracies of between one and three thousandths of an inch. Further, prior developments, would mount the brake mechanism directly on the base rather than on the headstock in order to reduce deflection and distortion of the headstock, so as to increase accuracy during prolonged use.

Additionally, no mechanism was provided for balancing of the spindle itself upon and after installation in the headstock. Thus, in time, spindles due to wear and misalignment would have to be pulled and new spindles repositioned in order to assure continued accuracy.

Other problems with present headstocks include failure to be able to prevent coolant and dirt and dust particles from entering into the headstock assembly. This eventually causes wear and break-downs requiring shutdown of the machine and replacement of parts.

Another problem with present machines is that the touch-off plate is generally mounted in an area which is difficulty accessible on either the headstock or on the base and which requires rather complex gauging devices for accurately determining tool wear as machine operations proceed.

Another problem with present machines is that the headstock mounts have no mechanism for protecting the headstock, should shearing of the bolts holding the headstock to the base occur. Obviously, severe pressures placed on the bolts may cause failure and the whole headstock will tear away from the base causing substantial damage necessitating replacement of substantial components, if not all of the headstock.

In the past, it has been the practice of machine tool manufacturers to mount components such as brake members, collet closers, and spindle encoders directly on the base in order to insure accuracy. This requires increasing the size of the base in order to support all the various components adding to costs.

OBJECTS AND SUMMARY OF THE INVENTION

It is an object of this invention to provide a headstock assembly for chucker and bar machines which substantially reduces thermal growth during long machine operation thereby increasing the accuracy of the machine.

A further object of this invention is to provide a headstock assembly which will maintain accuracies during long periods of use substantially below one to three thousandths and preferably in the order of 1 or 2 ten-thousandths.

Another object of this invention is to provide radiating fins for dissipating heat build up caused by friction of the bearings after long use.

Still another object of this invention is to provide a bearing assembly which is designed to increase stiffness of the spindle thus reducing deflections due to torque and tool impact and pressure.

Still a further object of this invention is to provide a low pressure air means for the headstock bearing cap which will prevent entry into the headstock of coolant, dust, or other particles which would cause wear or reduced lubricating effectiveness in the bearings.

Another object of this invention is to provide a center pin mount on the base of the headstock which receives a pin mounted in the base for permitting the headstock to pivot during set up for alignment.

A further object of this invention is to provide a touch-off point such that the measuring gauge would move in the same relationship with the headstock.

A still further object of this invention is to provide a headstock assembly which includes a brake disc mechanism directly mounted on the spindle which in turn is directly mounted on the pulley for driving the spindle.

Yet a further object of this invention is to provide on the headstock support means for the spindle encoder which eliminates the necessity of having to mount the same directly on the base.

A further object of this invention is to provide balancing means for the spindle mounted adjacent the brake disc and easily accessible for enabling the making balancing adjustments of the spindle without having to remove the same from the headstock when the machine is assembled.

An additional object of this invention is to provide means for mounting the collet closer directly on the drawtube and accurately positioned with respect to the pulley and brake mechanism.

Another object of this invention is to provide a headstock assembly which can be readily manufactured and assembled with a minimum of costs and tooling.

In summary therefore, this invention is directed to a headstock and a headstock assembly which can support many components and still have a minimum thermal growth during long machine operations thus providing for increased accuracy in machine operations over long periods, as well as reducing maintenance and replacement of parts.

These and other objects of this invention will be apparent from the following description and claims.

DESCRIPTION OF THE DRAWINGS

In the accompanying drawings which illustrate by way of example various embodiments of this invention.

DESCRIPTION OF FIGS. 1 THROUGH 5

Figure 1:
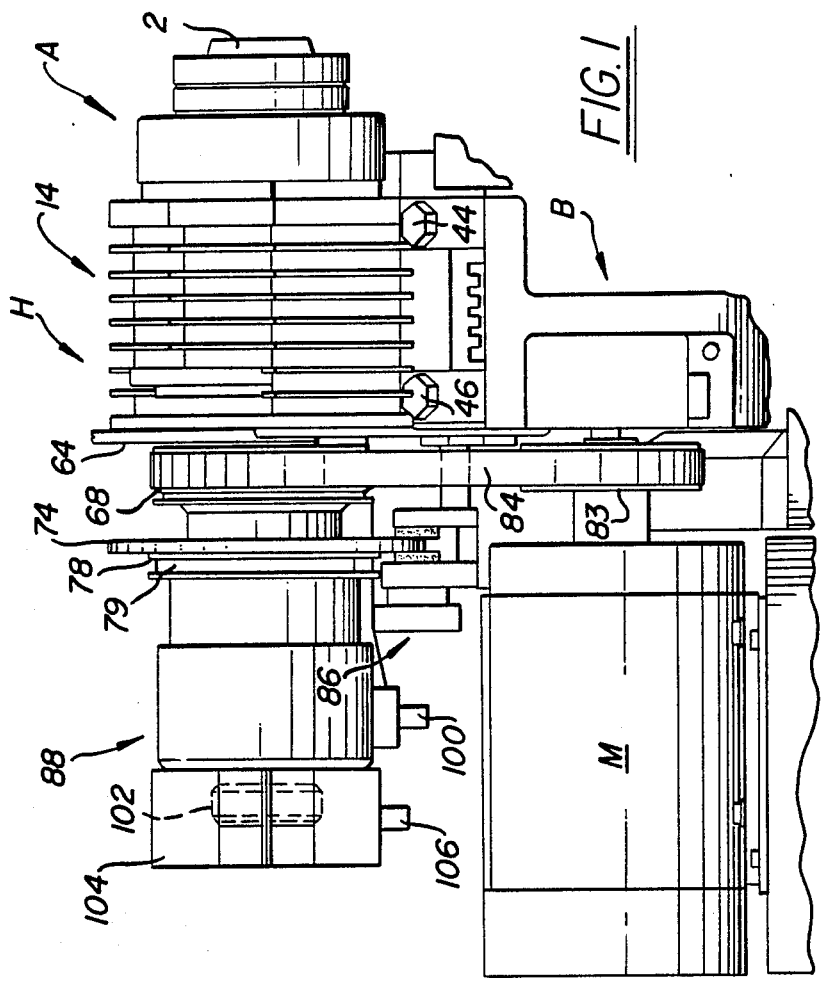
FIG. 1 is a fragmentary side elevational view showing the headstock assembly mounted on the machine base.
Figure 2:
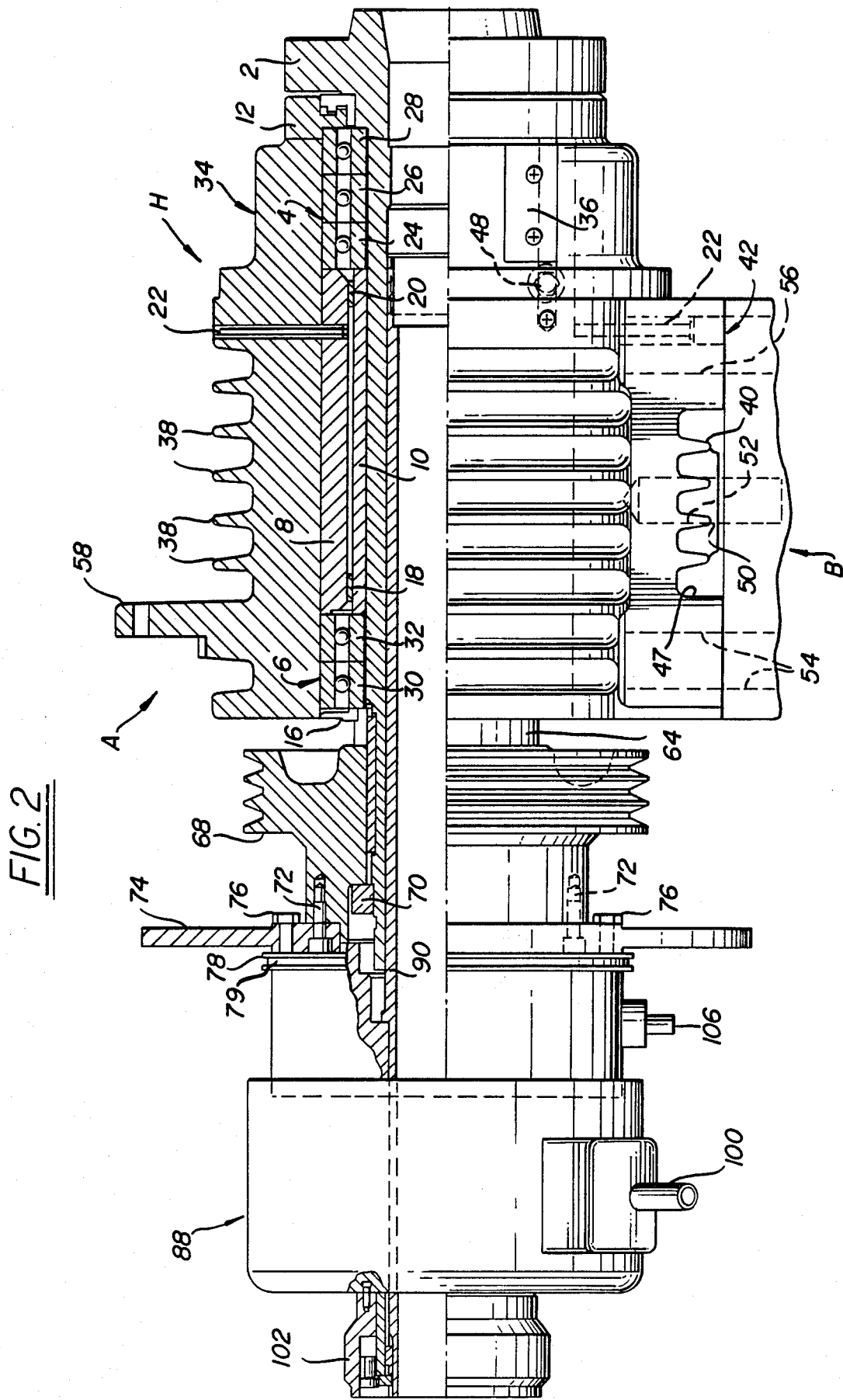
FIG. 2 is a side elevational view of the headstock assembly with portions shown in cross-section.
Figure 4:
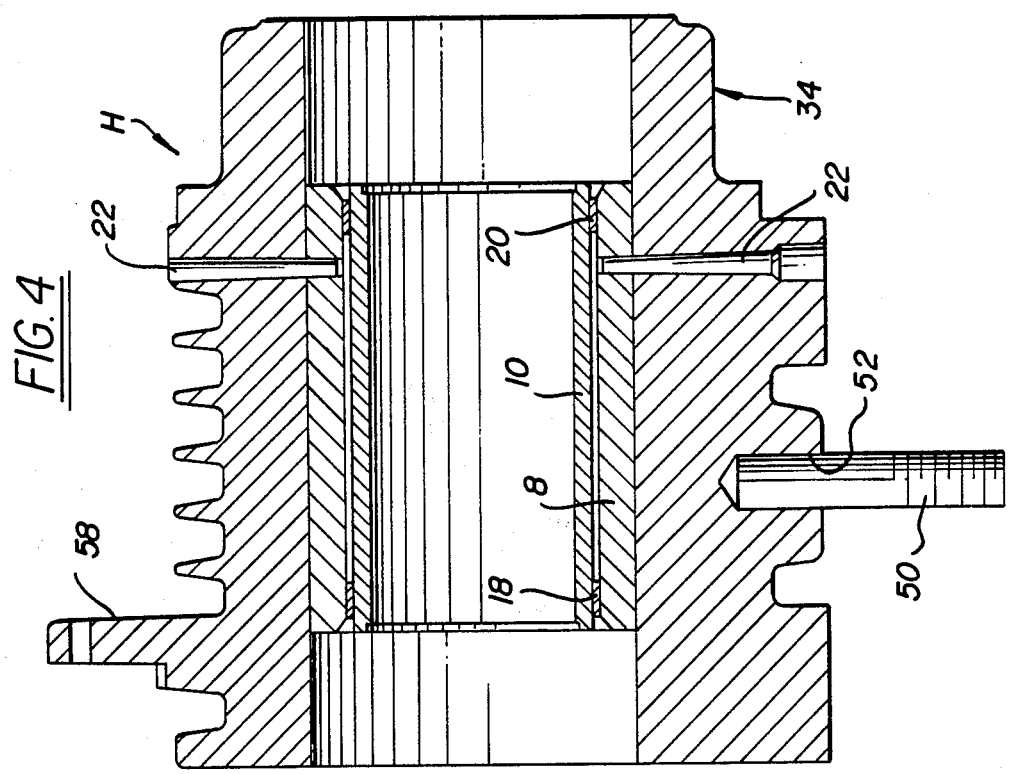
FIG. 4 is a cross-sectional view of the headstock assembly with the spacer sleeve for the bearings in position.

Referring now to FIG. 1, the headstock assembly A is mounted on the machine base B. The headstock H, as best shown in FIG. 2, mounts a spindle 2. The spindle 2 is supported on a front bearing assembly 4 and a rear bearing assembly 6 which are separated from each other by bearing spacer sleeves 8 and 10. Retainer rings 12 and 14 position the front bearing assembly 4 and retainer ring 16 positions rear bearing assembly 6. Between bearing spacer sleeves 8 and 10 are spacer rings 18 and 20, as best shown in FIG. 4. Tapered positioning pins 22 are provided for bearing spacer sleeve 8.

Front bearing assembly 4 is shown in FIG. 2, with three side-by-side front bearings 24, 26 and 28. Rear bearing assembly 8 is provided with rear bearings 30 and 32. The three front bearings 24, 26 and 28 and the two rear bearings 30 and 32, provide five point contact with the spindle 2 thus giving greater stiffness and strength to the spindle particularly at the nose of the spindle so as to reduce deflection or distortion, thus providing greater accuracy during machining operations. The bearing spacer sleeves 8 and 10 must be of a length greater than the combined lengths of bearings 24, 26, 28, 30 and 32, but not exceeding about 1½times their combined length. Greater length of the bearing spacer sleeves will tend to promote tubular distortion of the spindle 2 and thus reduce accuracy.

On the nose of the headstock 34, is positioned on the front side thereof, a touch-off plate 36. This plate is, as shown, bolted to the nose 34 of the headstock H and permits the machinist to determining wear on tooling by a touch-off arm which acts or react the same as the head.

Figure 3:
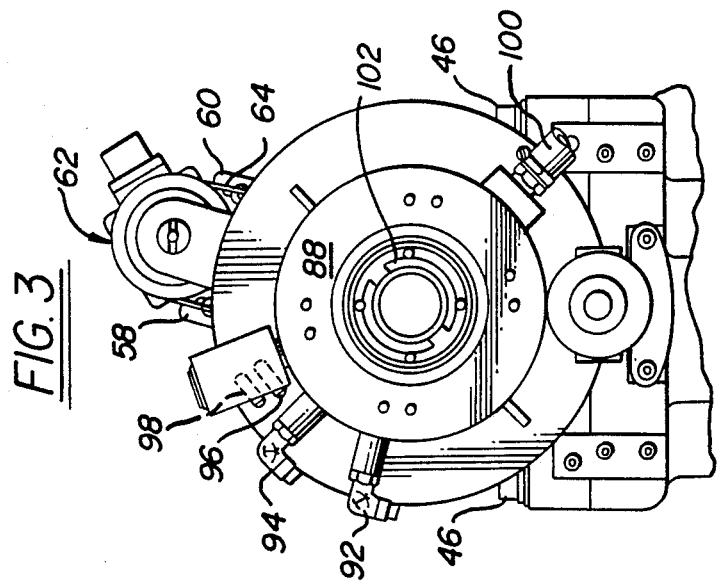
FIG. 3 is the rear end elevational view of the headstock assembly with portions shown in phantom lines.
Figure 6:
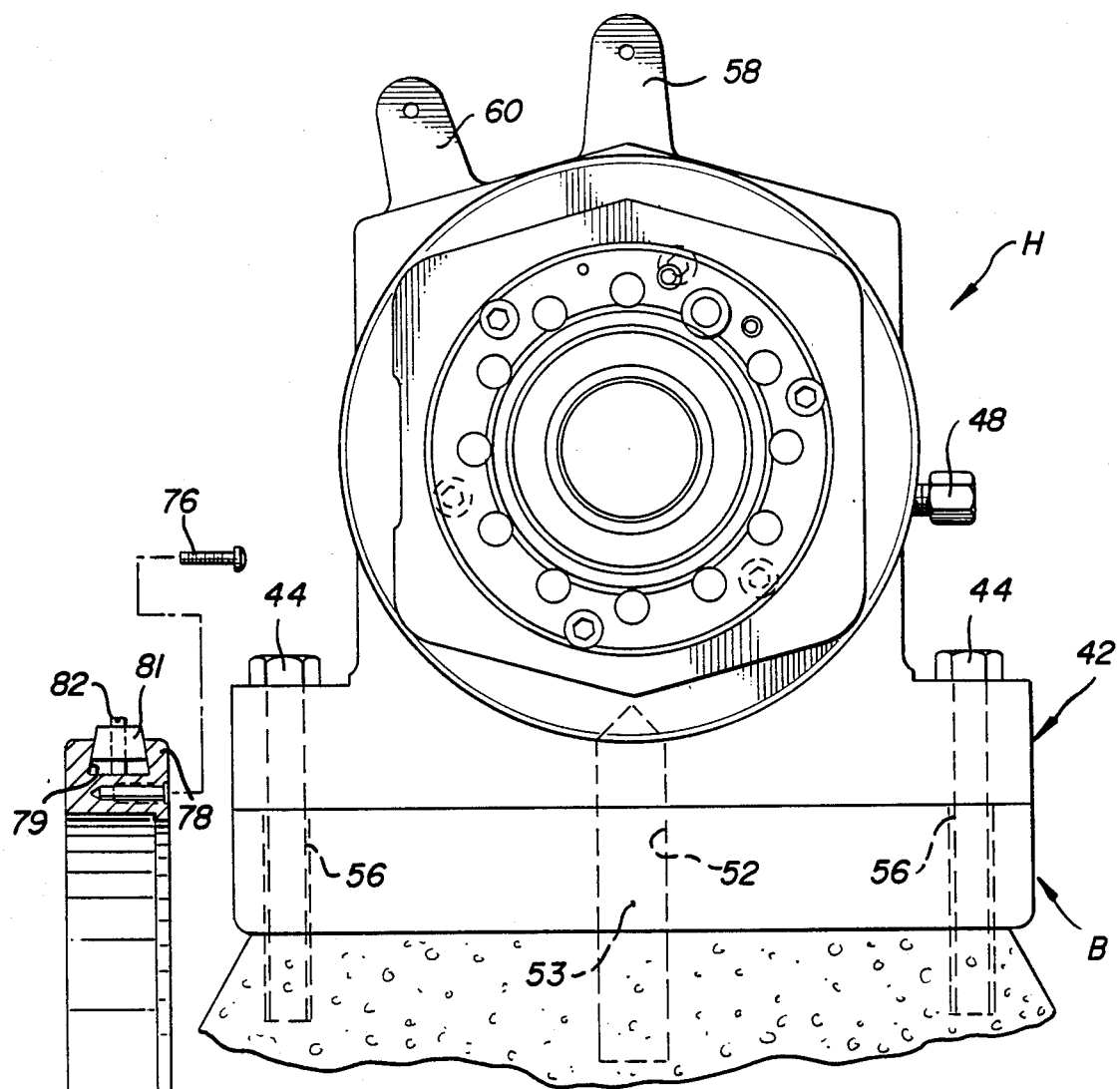
FIG. 6 is a front elevational view of the headstock assembly portions being shown in phantom lines.
Figure 7:
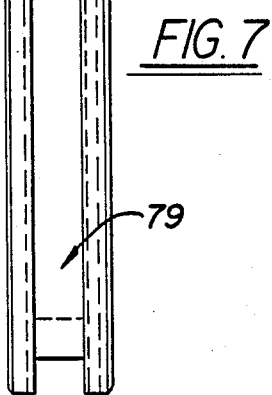
FIG. 7 is a side elevation of the balancing disc with portions shown in cross-section.
Figure 8:
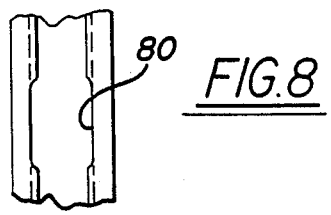
FIG. 8 is a fragmentary elevational view of the balancing disc showing the insert opening for the weights.

Between the bearing assemblies 4 and 6, and on all sides of the headstock H, are cooling fins 38 which extend from one side across the top and down the other side of the headstock H. Cooling fins 40 are positioned underneath the bottom of the headstock on the headstock base mount 42. As best shown in FIGS. 3 and 6, front bolts 44 and rear bolts 46 secure the headstock to the base B.

The inclusion of the fins 38 and 40 enables the headstock H to be reduced in size since the fins radiate the heat readily. The cooling fins 40 are positioned in a cross channel 47. They extend upwardly therefrom, but the tops of the fins 40 lie beneath the surface of the bottom of base mount 42.

Referring to FIG. 2, a low air pressure passageway 48 is provided in the headstock H for providing air from about 1½ to 2½PSI to the area in the headstock nose 34 adjacent the front bearing assembly 4. A constant supply of low pressure air in this area prevent coolant fluid during machine operation as well as dust particles and the like from entering in and causing friction and wear on the parts of the headstock assembly A.

Figure 5:
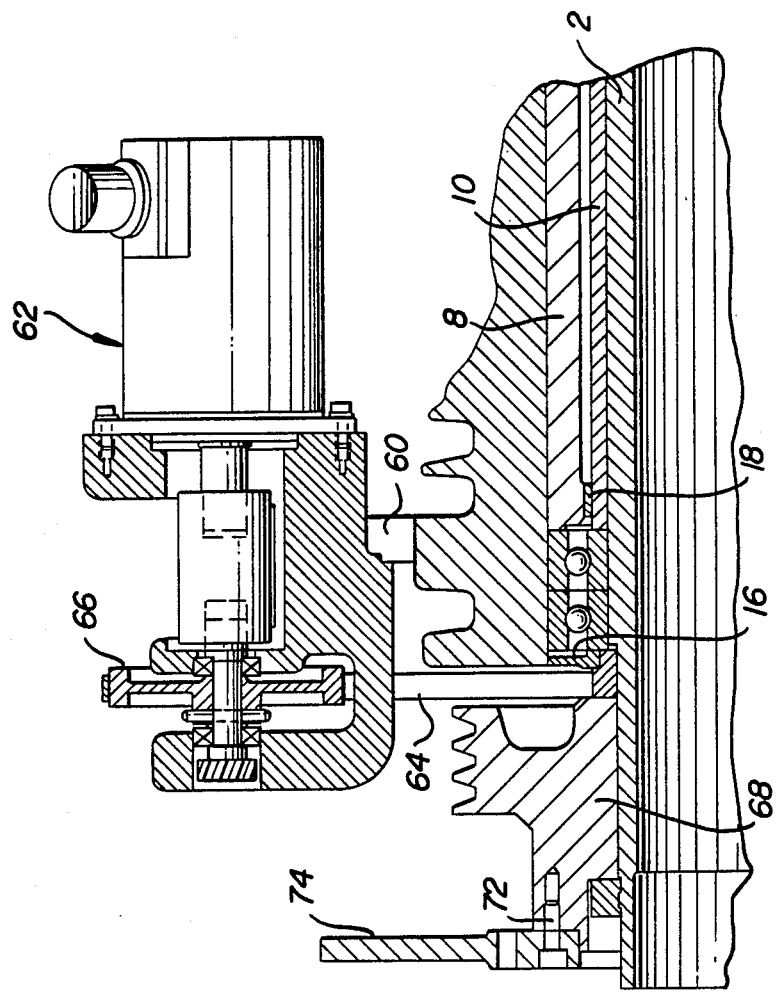
FIG. 5 is a partial fragmentary cross-sectional view of the headstock with the spindle encoder mounted thereon.

Centrally located in the headstock base mount 42, is a projection 50, as best shown in FIGS. 2 and 4, provided with a pivot pin opening 52. A pin 53 (FIG. 6) mounted in the base B, allows for pivoting of the headstock assembly A in case of a crash. A crash will occur when the bolts 44 and 46 are severed or sheared due to excessive forces caused by tool impact and the like during machine operation. Pivoting of the headstock assembly A about the pivot pin 53, allows for ready repositioning by the machine operator of the assembly and the reinstallation of new bolts 44 and 46 in the bolt holes 54 and 56, as best shown in FIG. 5.

Adjacent the rear of the headstock and at the top thereof, are mounts 58 and 60 for mounting a spindle encoder 62 as best shown in FIGS. 3 and 6. The spindle encoder 62 includes a driven timing belt 64 which is driven by the spindle 2. A belt pulley 66 feeds information to the spindle encoder 62 from the spindle shaft 2.

Mounted on the spindle 2 is the drive pulley 68. Lock ring 70 positions pulley 68 on the spindle 2.

Secured to the pulley 68 by means of screws 72 is a brake disc 74.

Secured to the brake disc 74 by means of adjustment screws 76, is a balancing disc 78. Disc 78 includes a dovetail slot 79 including an opening 80 into which slot conforming weights 81 are inserted. Adjustment screw 82 locks weights 81 in the slot 79. Shifting weights 81 in the slot 79 permits accurate balancing of the spindle at anytime to adjust for spindle wear. Previously, a machinist would need to more frequently replace the spindle. With such a balancing disc 78, the service life of a spindle is greatly extended.

FIG. 1 shows a motor M mounted on the base B with a drive pulley 83 driving a belt 84 on the drive pulley 68 which drives the spindle 2.

Above the motor M and mounted on the base B, is a brake assembly 86 which, when operating, engages the brake disc 74 to brake the spindle 2 as required.

A collet closure assembly 88 is mounted on the drawtube 90, as best shown in FIG. 2. Operation details of the collet closure assembly 88 are standard in the art and not described herein. The collet closure 88 is secured to the base B by means not shown. In operation, fittings 92, 94, 96 and 98 are connected to proper fluid sources for shifting the drawtube 90 for operating of a collet positioned thereon (not shown). A drain 100 is provided on the collet closure 88.

An adjusting nut 102 is provided at the end of the drawtube 90 and as shown in FIG. 1, is protected by a housing 104 with a drain 106 at the bottom thereof.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A headstock assembly for a chucker and bar machine, comprising:
    (a) a headstock;
    (b) a spindle rotatably mounted in said headstock;
    (c) a pulley mounted on said spindle and rotatable therewith;

(d) a drawtube mounted in said spindle and rotatable therewith for securing a collet thereto;
(e) a brake disc mounted on said pulley and rotatable therewith for engagement with a brake for braking said spindle;
(f) a collet closer mounted on said drawtube;
(g) a tool touch-off plate mounted on the front of said headstock;
(h) pressure means associated with said collet closer to cause said drawtube to reciprocate relative to said spindle to open and close a collet secured to said drawtube.

2. A headstock assembly as in claim 1 and wherein:
(a) said headstock has a front and a rear,
(b) said headstock includes front and rear bearing means mounted on said spindle for maintaining stiffness and rigidity to said spindle.

3. A headstock assembly as in claim 2 and wherein:
(a) said front bearing means includes a plurality of bearing units mounted on said spindle.

4. A headstock assembly as in claim 2 and wherein:
(a) said rear bearing means includes a plurality of bearing units mounted on said spindle.

5. A headstock assembly as in claim 3 and wherein:
(a) said front bearing means includes three bearing units.

6. A headstock assembly as in claim 4 and wherein:
(a) said rear bearing means includes two bearing units.

7. A headstock assembly as in claim 3 and wherein:
(a) said front and rear bearing means includes a five point bearing contact with said spindle.

8. A headstock assembly as in claim 7 and wherein:
(a) said five point bearing contact includes a forward three point bearing contact and a rearward two point bearing contact,
(b) said two and three point bearing contacts are axially spaced from each other a substantial distance, and
(c) said two and three point bearing contacts each include adjacent side by side ring bearing means.

9. A headstock assembly as in claim 2 and wherein:
(a) said headstock includes heat radiating fins positioned between said front and rear bearing means for radiating heat generated by said bearing means when said spindle is rotated.

10. A headstock assembly as in claim 9 and wherein:
(a) said fins are positioned about at least a major portion of said headstock to maintain thermal growth to a minimum.

11. A headstock assembly as in claim 1 and wherein:
(a) said headstock includes support bracket means extending therefrom, and
(b) spindle encoder means mounted on said support bracket means in close proximity to said spindle and connected to said spindle for inputting the rotational speed of said spindle into said encoder.

12. A headstock assembly as in claim 11 and wherein:
(a) said spindle encoder is mounted on the top and toward the rear of said headstock.

13. A headstock assembly as in claim 12 and wherein:
(a) said spindle encoder includes a timing belt extending between said encoder and said spindle.

14. A headstock assembly as in claim 2 and including:
(a) low pressure air means in said headstock front for maintaining a low pressure air supply to said front bearing means to prevent coolant and foreign material from getting into said bearing means.

15. A headstock assembly as in claim 14 and wherein:
(a) said air pressure means maintains pressure between 1½ to 2½PSI.

16. A headstock assembly as in claim 1 and wherein:
(a) said pulley and said break disc are mounted closely adjacent the rear of said headstock and said spindle.

17. A headstock assembly as in claim 1 and including:
(a) balancing ring means adjacent said break disc mounted on said spindle for damping vibration of said spindle.

18. A headstock assembly as in claim 17 and wherein:
(a) said balancing ring means includes at least one shiftable weight, and
(b) means for locking said shiftable weight to said ring.

19. A headstock assembly as in claim 1 and wherein:
(a) said headstock includes a pivot pin opening in the bottom thereof for receiving a pivot pin mounted in a base to which the headstock is secured for pivoting said assembly, should a crash occur causing the need for said headstock to be realigned.

20. A headstock assembly as in claim 19 and including:
(a) spaced anchor means on said headstock for rigidly securing said headstock to a base.

21. A headstock for chucker and bar machines comprising:
(a) front, rear, top, bottom and sides;
(b) a spindle mounting means in said headstock;
(c) a front spindle bearing assembly mounted in the front of said headstock;
(d) a rear spindle bearing assembly mounted in the rear of said headstock;
(e) means for spacing and locking said front and rear bearing assemblies in said headstock;
(f) a touch-off plate mounted on a side of said headstock in the area of said front bearing assembly; and
(g) said headstock having cooling fins positioned between said headstock front and rear.

22. A headstock as in claim 21 and wherein:
(a) said cooling fins extend along at least said headstock top and sides.

23. A headstock as in claim 22 and wherein:
(a) said cooling fins extend along said headstock bottom.

24. A headstock as in claim 21 and including:
(a) a base support mount.

25. A headstock as in claim 24 and wherein:
(a) said base support mount includes anchoring means for anchoring said headstock to a base.

26. A headstock as in claim 25 and wherein:
(a) said base support mount includes cooling fins extending downwardly therefrom.

27. A headstock as in claim 26 and wherein:
(a) said base support mount includes a downwardly facing channel, and
(b) said cooling fins are positioned in said channel.

28. A headstock as in claim 23 and wherein:
(a) said headstock has a longitudinal axis, and
(b) said cooling fins extend transversely to said longitudinal axis.

29. A headstock as in claim 27 and wherein:
(a) said base support cooling fins lay entirely within said channel.

30. A headstock as in claim 21 and including:
(a) a passageway in the front of said headstock for directing low pressure air to said front bearing assembly to prevent cooling fluid and particles from entering into said bearing assemblies.

31. A headstock as in claim 25 and including:
(a) a pivot means positioned centrally of the bottom of said headstock for permitting said headstock to pivot about a pin mounted in the base of said chucker and bar machine, should said anchoring means fail in case of a crash.

32. A headstock as in claim 21 and including:
(a) mounting means on the rear of said headstock for supporting a spindle encoder means.

33. A headstock as in claim 32 and including:
(a) spindle encoder means mounted on said mounting means.

34. A headstock as in claim 21 and wherein:
(a) said front bearing assembly includes three spindle bearings mounted immediately adjacent each other.

35. A headstock as in claim 21 and wherein:
(a) said rear bearing assembly includes two spindle bearings mounted immediately adjacent each other.

36. A headstock as in claim 21 and wherein:
(a) said spindle bearing assemblies provide a spaced five point spindle support means having a two point rear support and three point front support, and
(b) said front and rear supports being spaced from each other a substantial distance greater than the combined width of said bearing assemblies and less than one and a half times said combined width.

37. A headstock as in claim 21 and including:
(a) locking pins extending through said headstock and into said bearing assemblies spacing and locking means.

38. A headstock as in claim 37 and wherein:
(a) said locking pins are tapered.

39. A headstock assembly as in claim 17 and including:
(a) a collet closer mounted on said drawtube adjacent said balancing rings.

40. A headstock assembly as in claim 39 and wherein:
(a) said collet closer includes hydraulic inlet and outlet means, and
(b) drain means in said collet closer.

41. A headstock assembly as in claim 40 and including:
(a) a cover member including a drain mounted on the end of said drawtube adjacent said collet closer.

42. A headstock assembly as in claim 1 and including:
(a) a machine base, and
(b) means for securing said headstock assembly to said base.

43. A headstock assembly as in claim 42 and including:
(a) a brake, and
(b) means on said base for mounting said brake in close proximity to said brake disk for interaction therewith.

* * * * *